United States Patent
Arthur et al.

(10) Patent No.: US 7,695,839 B2
(45) Date of Patent: Apr. 13, 2010

(54) METHOD FOR IMPROVED POWER UP-TRANSIENT RESPONSE IN THE FUEL CELL SYSTEM

(75) Inventors: David A. Arthur, Honeoye Falls, NY (US); Abdullah B. Alp, West Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 232 days.

(21) Appl. No.: 11/549,766

(22) Filed: Oct. 16, 2006

(65) Prior Publication Data

US 2008/0187804 A1    Aug. 7, 2008

(51) Int. Cl.
*H01M 8/04*    (2006.01)
*H01M 8/12*    (2006.01)
*H01M 8/00*    (2006.01)

(52) U.S. Cl. .......................................... 429/25; 429/13
(58) Field of Classification Search .................... 429/13, 429/22, 26, 25
See application file for complete search history.

(56) References Cited

U.S. PATENT DOCUMENTS

2006/0029847 A1    2/2006    Yumita et al.
2008/0081224 A1*   4/2008    Burch et al. .................. 429/13

* cited by examiner

*Primary Examiner*—Dah-Wei D Yuan
*Assistant Examiner*—Stephan Essex
(74) *Attorney, Agent, or Firm*—John A. Miller; Miller IP Group, PLC

(57) ABSTRACT

A fuel cell system that employs a method for increasing stack power ramp up for high power up-transients by decoupling the build-up of stack current density from the cathode side pressure. The system gives the compressor power priority during the power up-transient to quickly provide the proper compressor speed, and therefore the proper air mass flow, for the desired current density of the fuel cell stack. The system also maintains the cathode side pressure of the stack low by keeping a cathode back-pressure valve open. By increasing the cathode input airflow rate to the proper level at the power up-transient, the current density of the stack will increase to the desired stack power level. Subsequently, the back-pressure valve is closed to increase the stack voltage to provide the total maximum power achievable by the stack.

9 Claims, 2 Drawing Sheets

METHOD FOR IMPROVED POWER UP-TRANSIENT RESPONSE IN THE FUEL CELL SYSTEM

BACKGROUND OF THE INVENTION

1. Field of the Invention

This invention relates generally to a method for providing power distribution in a fuel cell system and, more particularly, to a fuel cell system that provides a high compressor power and a low cathode output pressure to improve up-transient power responses.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of the vehicle may not be acceptable. The voltage cycles can increase the stack durability. These drawbacks can be minimized by using a high voltage battery in parallel with the fuel cell stack. Algorithms are employed to provide the distribution of power from the battery and the fuel cell stack to meet the requested power.

Some fuel cell vehicles are hybrid vehicles that employ an electric energy storage system (EESS) in addition to the fuel cell stack, such as a DC battery or a super capacitor (also referred to as an ultra-capacitor or double layer capacitor). The EESS provides supplemental power for the various vehicle auxiliary loads, for system start-up and during high power demands when the fuel cell stack is unable to provide the desired power. More particularly, the fuel cell stack provides power through a DC voltage bus line to an electric traction system (ETS) for vehicle operation. The EESS provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the EESS at those times when the fuel cell stack is able to meet the system power demand. The generator power available from the traction motor during regenerative braking is also used to recharge the battery through the DC bus line.

Acceptable time periods for automotive applications from idle power to full power is on the order of two to three seconds. Currently, fuel cell vehicles are not able to provide power up-transients as quickly as desired. Generally, the up-transient response limitations for fuel cell systems occur because the fuel cell stack cannot receive cathode air fast enough. The compressor itself is able to ramp up fast enough provided that it receives adequate power. However, it is the ability to provide the power to the compressor that limits the ability of the compressor to provide airflow to the fuel cell stack fast enough. Part of the problem is cyclical in that the compressor typically receives its power from the fuel cell stack, and the fuel cell stack power is generally too low at low stack power to provide high compressor speeds.

The high voltage battery typically provided in a hybrid fuel cell vehicle can help provide compressor power during power up-transients to provide the requested ETS power quick enough. However, the battery has limitations in that typically the battery will not be allowed to fall below a predetermined minimum state-of-charge (SOC).

SUMMARY OF THE INVENTION

In accordance with the teachings of the present invention, a fuel cell system is disclosed that employs a method for increasing stack power ramp up for high power up-transients by decoupling the build-up of stack current density from the cathode side pressure. The system gives the compressor power priority during the power up-transient to quickly provide the proper compressor speed for the desired current density of the fuel cell stack. The system also maintains the cathode side pressure of the stack low by keeping a cathode back-pressure valve open. By increasing the cathode input airflow rate to the proper level at the power up-transient, the current density of the stack will increase to the desired stack power level. Subsequently, the back-pressure valve is closed to increase the stack voltage to provide the total maximum power achievable by the stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for increasing the power up-transient response of a fuel cell hybrid vehicle is merely exemplary in nature, and is in no way intended to limit the invention or its applications or uses.

Figure 1:
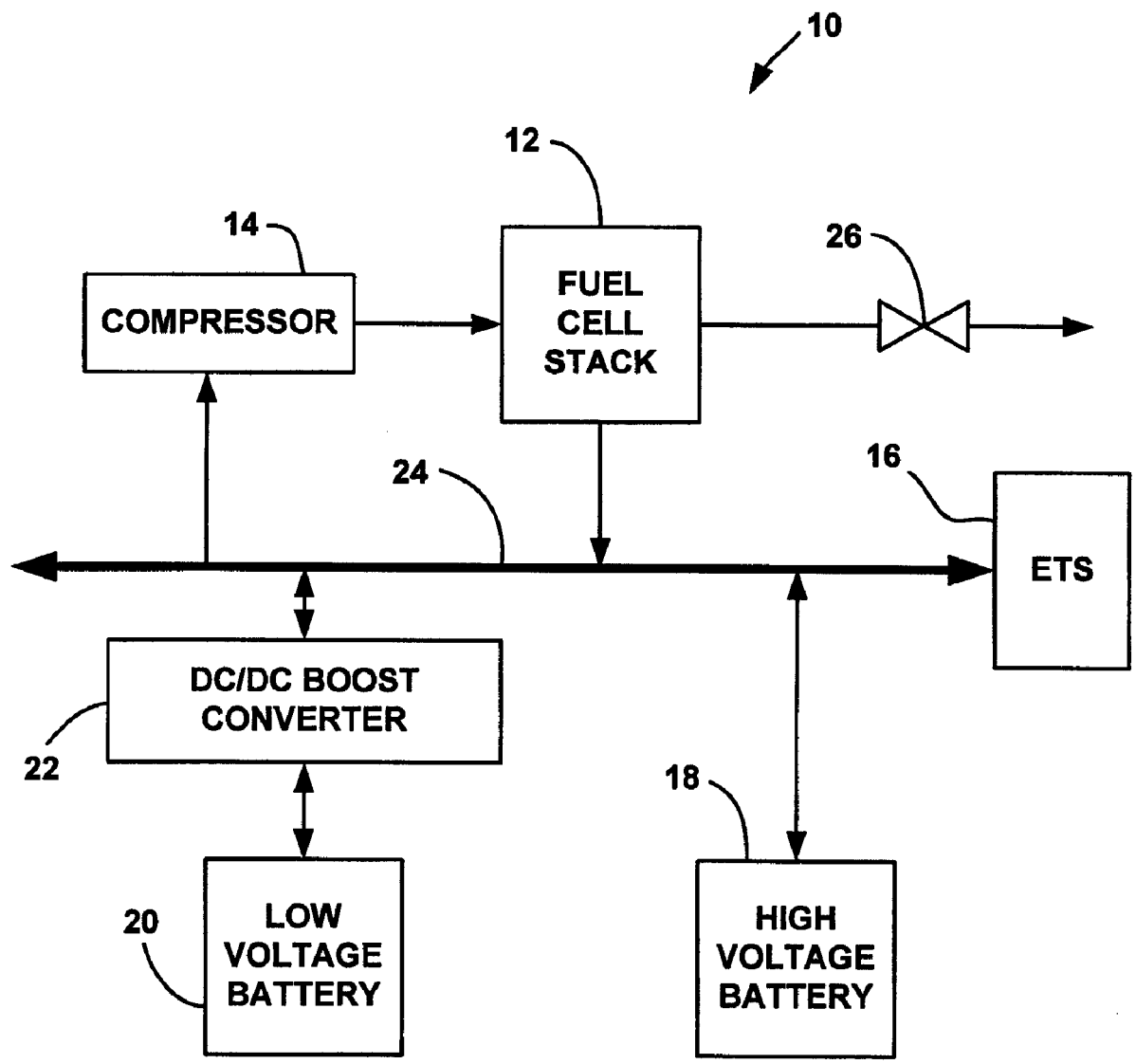
FIG. 1 is a simplified block diagram of a power system for a hybrid fuel cell vehicle.

FIG. 1 is a general block diagram of a power system 10 for a fuel cell hybrid vehicle. The power system 10 includes a fuel cell stack 12 and a compressor 14 that provides airflow to the cathode side of the fuel cell stack 12. The system 10 also includes a cathode side back-pressure valve 26 in the cathode exhaust gas line that is used to control the cathode side pressure of the stack 12. The power system 10 also includes an electric traction system (ETS) 16, a high voltage battery 18 and a low voltage battery 20. The high voltage battery 18 is intended to represent any high voltage electric energy storage system suitable for the purposes discussed herein. In one embodiment, the low volt battery is a standard 12-volt vehicle battery. The power is distributed between the components in the power system 10 on a high voltage bus 24. A high voltage DC/DC boost converter 22 increases the power from the low voltage battery 20 to a level suitable for the power system 10. The components of the power system 10 are all well known to those skilled in the art interconnected as shown. As will be discussed in detail below, the power system 10 employs an algorithm that increases the power up-transient response as to how fast the fuel cell stack 12, the battery 18 and the battery 20 can provide power to the ETS 16.

The known power systems for fuel cell hybrid vehicles respond to an up-transient power request by providing increased power to the compressor 14 to satisfy the request. However, the compressor 14 may not receive its maximum power, where most of the available power is provided to the ETS 16 to satisfy the power request. The known power systems also close the back-pressure valve 26 at the beginning of the power up-transient. A higher airflow to the cathode side of the stack 12 supports a higher fuel cell stack current density, and a higher cathode side pressure increases stack voltage. Therefore, in order to provide the high power for the up-transient power request, it is typically necessary to have both a high cathode airflow and a relatively high cathode side pressure.

The present invention proposes an alternate technique for providing a power up-transient that allows the system 10 to provide high power to the ETS 16 faster than has been provided by the prior art. The fastest way to build stack power is to increase the stack current density as quickly as possible, where the stack current density is directly related to the cathode airflow. According to the invention, the build-up of the stack current density is decoupled from the cathode side pressure. The power system 10 gives the compressor 14 power priority during a power up-transient to quickly provide the proper compressor speed, and therefore the proper air mass flow rate, for the desired current density of the fuel cell stack 12. The system 10 also maintains the cathode side pressure of the stack 12 low by keeping the back-pressure valve 26 open. Particularly, the back-pressure valve 26 is opened completely, or almost completely, at system idle, and is maintained in the open or ambient condition during the power up-transient until the current density of the stack is at or near the current density for the desired power level. By increasing the cathode input airflow rate to the proper level at a power up-transient, the current density of the stack 12 will increase to the desired stack power level. Subsequently, the back-pressure valve 26 is closed thereafter to increase the stack voltage, and provide the desired stack relative humidity levels and other factors, to provide the total maximum power achievable by the stack 12.

Figure 2:
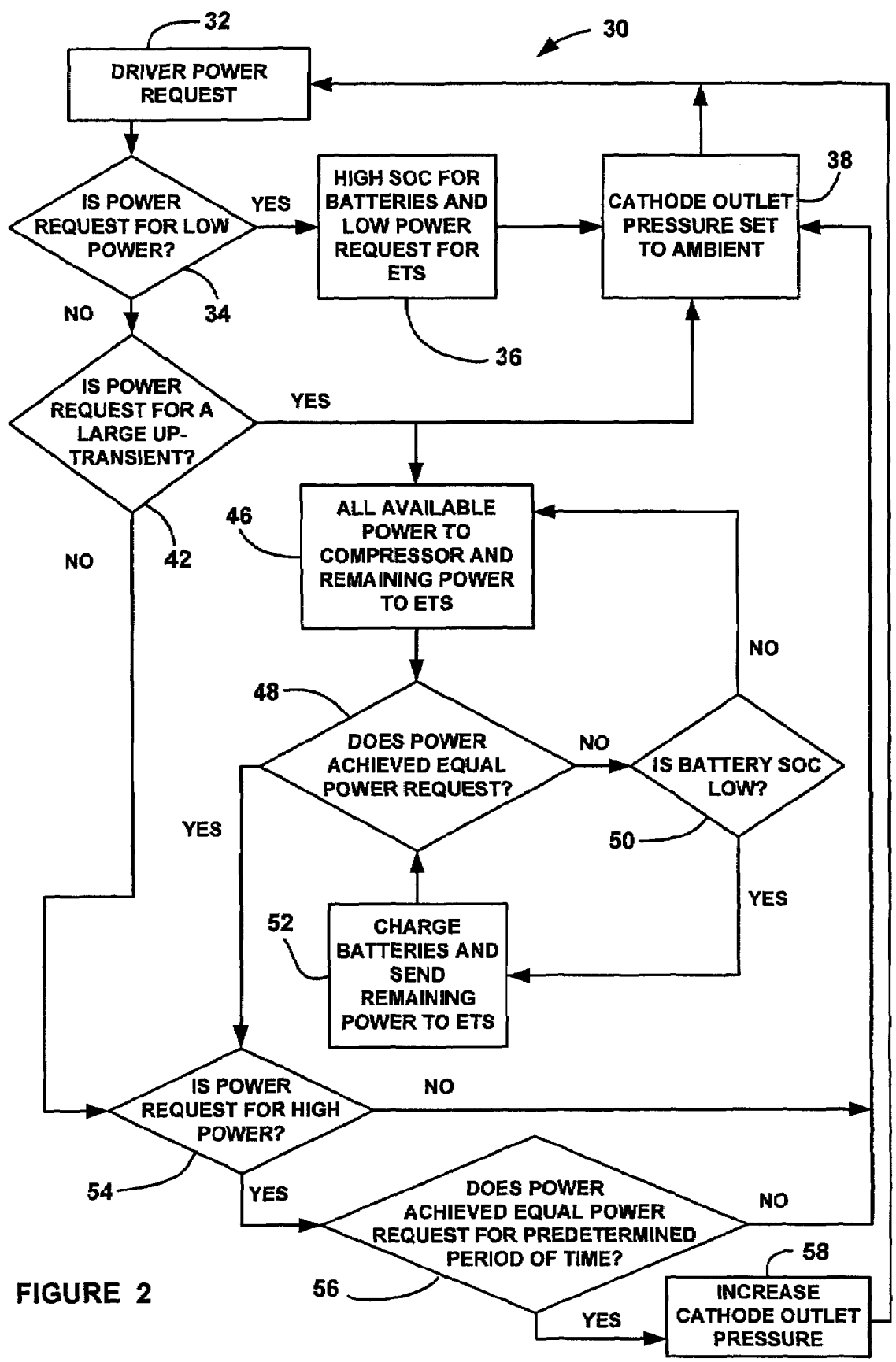
FIG. 2 is a flow chart diagram showing a process for increasing the up-transient power response time for a fuel cell vehicle, according to an embodiment of the present invention.

FIG. 2 is a flowchart diagram 30 showing a process of the invention for quickly increasing the power from the fuel cell stack 12 at a high power up-transient request. The algorithm monitors the driver power requests from the ETS 16 at box 32. The algorithm determines whether the power request is for low power, such as idle, at decision diamond 34. If the power request is for low power at the decision diamond 34, then the algorithm causes the fuel cell stack 12 to maintain the state-of-charge of the low voltage battery 20 and the high voltage battery 18 by charging at their maximum state-of-charge level, and provides the requested low power to the ETS 16 using a low compressor speed at box 36. Further, the cathode outlet pressure provided by the back-pressure valve 26 is set to ambient, i.e., opened, at box 38, and the algorithm returns to monitoring the driver power request at the box 32.

If the power request is not for low power at the decision diamond 34, then the algorithm determines whether the power request is for a high power up-transient, which is a predetermined value, at decision diamond 42. If the power request is for a high power up-transient at the decision diamond 42, then the algorithm keeps the cathode outlet back-pressure valve 26 at the ambient pressure position at the box 38 and then returns to monitoring the driver power request at the box 32. Further, the algorithm sends all, or most, of the available power to the compressor 14 up to the maximum power accepted by the compressor 14, such as 13 kW, to increase the speed of the compressor 14 as quickly as possible at box 46. The power can come from the fuel cell stack 12, the high voltage battery 18 and the low voltage battery 20. The low voltage battery 20 is typically used for system start-up and to provide auxiliary power when the system 10 is off. However, according to this embodiment of the invention, the power from the low voltage battery 20 can also be boosted by the DC/DC boost converter 22 to help with the power needed by the compressor 14. Additionally, any remaining power that exceeds the power limit of the compressor 14 from the fuel cell stack 12, the low voltage battery 20 and the high voltage battery 18 can be used to power the ETS 16 to achieve the requested power level.

The algorithm then determines whether the power achieved by the ETS 16 is equal to the power request to provide the desired vehicle speed at decision diamond 48. If the desired power has not been achieved at the decision diamond 48, then the algorithm determines whether the charge of the low voltage battery 20 or the high voltage battery 18 has dropped to its minimum state-of-charge level at decision diamond 50. If the state-of-charge of either the high voltage battery 18 or the low voltage battery 20 is not at its minimum state of charge at the decision diamond 50, the algorithm returns to the box 46 to provide all of the available power to the compressor 14 and the remaining power to the ETS 16, as discussed above. If the state-of-charge of either the high voltage battery 18 or the low voltage battery 20 has been reduced to its minimum state-of-charge level at the decision diamond 50, then the algorithm allows the fuel cell stack 12 to charge either or both of the low voltage battery 20 or the high voltage battery 18 at box 52, and send the remaining available power from the stack 12 to the ETS 16 to provide the power up-transient request.

If the power achieved does equal the power request at the decision diamond 48, or the power request is not a high power up-transient at the decision diamond 42, the algorithm determines whether there is a request for a predetermined high power level at decision diamond 54. If there is not a request for a high power level at the decision diamond 54, then the algorithm returns to the box 38 to the maintain the cathode outlet pressure at ambient. If the power request is for high power at the decision diamond 54, then the algorithm determines whether the power achieved is equal to the power request for some predetermined period of time at decision diamond 56. In one non-limiting example, the time period is about 10 seconds. If the power achieved has reached the power request for less than the predetermined time period at the decision diamond 56, then the algorithm returns to the box 38 to keep the cathode outlet pressure at ambient. If, however, the power achieved has equaled the power request for more than the predetermined time period at the decision diamond 56, the algorithm will then close, or partially close, the back-pressure valve 26 at box 58 to increase the cathode side pressure, for example 145 kPa, to increase the voltage of the stack 12, as discussed above, to provide the maximum power.

One additional advantage of the present invention is that by maintaining the cathode pressure relatively low during a high power up-transient, the relative humidity of the membranes in the stack 12 can be better maintained.

To illustrate the algorithm of the invention, values can be provided for the power distribution of the power system 10. During system idle at, for example at t=−2.0 seconds, the compressor 14 may be receiving 1 kW of power from the fuel cell stack 12 to maintain the idle condition. Further, the low voltage battery 20 and the high voltage battery 18 do not provide any power to the ETS 16. Also, the fuel cell stack 12 may provide 1 kW of power to the low voltage battery 20 to maintain its state-of-charge at a maximum level and the stack 12 may provide 3 kW of power to the high voltage battery 18 to maintain its state-of-charge at a maximum level.

After an up-transient power request at t=0.1 seconds, for example a 90 kW power request, the prior art power systems may provide 7 kW to the compressor 14 from the high voltage battery 18, where a typical maximum compressor power is about 13 kW, and the stack 12 may provide 1 kW of power to the ETS 16 and the high voltage battery 18 may provide 23 kW to the ETS 16 to the meet the power demand. Thus, the compressor 14 does not get enough power to ramp up quick enough.

According to the invention, during the beginning of a high power up-transient, for example at t=0.1 seconds, the compressor 14 will receive 13 kW, its maximum, from the high voltage battery 18. If the battery 18 is not able to provide the maximum compressor power, then one or both of the low voltage battery 20 and the fuel cell stack 12 can provide the additional power. Further, the fuel cell stack 12 may provide 1 kW to the ETS 16, the low voltage battery 20 may provide 2 kW to the ETS 16 and the high voltage battery 18 may provide 17 kW to the ETS 16. In this scenario, the compressor 14 receives its maximum power to provide maximum airflow as quickly as possible to the stack 12, and the ETS 16 receives the remaining available power from the several power sources.

At about t=3.0 seconds at the end of the power up-transient request, the fuel cell stack 12 has reached its maximum current density and is able to provide about 84 kW, where the compressor 14 is still receiving 13 kW of power. Further, now the fuel cell stack 12 is charging the high voltage battery 18 and the low voltage battery 20 with about 5 kW and 1 kW, respectively.

Thus, according to the invention, the compressor 14 gets as much power as it can handle from all the power sources available, and the ETS 16 is secondary in power reception. The ETS 16 does not get as much power immediately at an up-transient power request as it might in the prior art system, but it reaches the power request quicker. Particularly, the compressor 14 will spin up quicker because it gets as much power as it needs. Once the speed of the compressor 14 is high, it is used to provide high cathode flow at low power, where the pressure is built later. The low voltage battery 20 and high voltage battery 18 will discharge quicker, but the fuel cell stack power will be able to recharge them in a fast enough period of time. Thus, the fuel cell stack 12 is able to provide an increased current density quicker than in the known systems.

As discussed above, according to the invention, a low cathode outlet pressure set-point is provided at low power conditions. On a subsequent power up-transient, the cathode pressure set-point does not rise for a short period of time. Then, after a few seconds, the cathode pressure set-point is increased to the eventual pressure needed at the higher power condition. As an alternative, the cathode side pressure could remain low until the system 10 determines that more voltage is needed from the stack 12. Because voltage increases with pressure, the pressure could be raised until either the voltage is obtained or a predetermined maximum pressure is reached. When the airflow builds, the back-pressure valve 26 remains fully open. The speed of the compressor 14 is increased until the feedback from a mass flow meter (not shown), or other sensing device, reaches the cathode pressure set-point needed to support the high power requested. At some time later, when the pressure build-up phase begins, the back-pressure valve 26 is closed. By varying the speed of the compressor 14 and the position of the back-pressure valve 26, using cathode outlet pressure and air mass flow at feedback, the whole system can operate in a cohesive manner.

In order to maintain a particular stack relative humidity at low/idle power and maintain stack durability, the cathode stoichiometry is high enough to maintain the stability and the cooling fluid outlet temperature is lowered to compensate for the high flow rate to maintain a desired relative humidity. The problem is that on a power up-transient, the stack 12 is cool at the same time the cathode stoichiometry drops from about 5 to about 1.8. This results in an instanteously high cathode outlet relative humidity, typically above 100%. Keeping the cathode outlet pressure low throughout the up-transient helps reduce the relative humidity swing upward with a power up-transient, resulting in better cathode water management.

According to the invention, all of the power from the various power sources are sent to the compressor 14 at a power up-transient so that the compressor speed, and therefore the air mass flow, can rise as quickly as possible. In the case of the fuel cell stack 12, the compressor 14 may consume as much as 13 kW. If the high voltage battery 18 is large enough to keep the rest of the system running and supply all of the 13 kW to the compressor 14, then this provides the initial power directly to the ETS 16. For example, if there is 1 kW of parasitics and the high voltage battery 18 provides 10 kW, then 1 kW should go to ensure that the system parasitic loads are adequately supported, but 9 kW should go directly to the compressor 14. Then the fuel cell stack 12 will supply all of the launch power. In a second example, if the high voltage battery 18 provides 30 kW, then 1 kW would still go to ensure that the system parasitic loads are adequately supported, 13 kW would go to the compressor 14 first, and any remaining power would be delivered to the ETS 16, generally up to 16 kW. Further, the DC/DC boost converter 22 boosts the low voltage battery 20 to a high voltage. The boost converter 22 thus provides advantages for starting the fuel cell stack 12. However, the present invention proposes that this energy could also be used during the operation similar to the high voltage battery usage.

On a power up-transient, all the power that the DC/DC boost converter 22 can supply would first be allocated to the compressor 14, then to the ETS 16. Overall it is an important consideration that the compressor 14 always receives power as the highest priority besides the system critical components, such as the 12 volt bus (not shown). After the transient is over, or when the batteries 18 and 20 becomes discharged below the predetermined minimum state-of-charge, whichever comes first, the system 10 should then adapt itself to partially charge the batteries 18 and 20 and supplying any power requested to the ETS 16.

The compressor 14 is typically the slowest component to respond in an up-transient power request. However, it fundamentally drives one of the most important aspects of the fuel cell system, i.e., supporting the reaction with air. The goal should be to spin the compressor 14 to the desired flow rate needed to support the power request as fast as possible, even if that implies the batteries 18 and 20 can send less power to the ETS 16 for hundreds of milli-seconds or a few short seconds.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing power in a fuel cell system, said method comprising:
    determining if a power up-transient is requested from the fuel cell system;
    providing a predetermined maximum power to a compressor that provides air flow to a fuel cell stack so as to increase stack current density as quickly as possible if a power up-transient is requested;
    maintaining the pressure of a cathode side of the fuel cell stack at ambient pressure during the power up-transient; and
    increasing the pressure of the cathode side of the fuel cell stack at or near the end of the power up-transient so that the current density of the stack increases relatively rapidly and the voltage of the stack increases at or near the end of the power up-transient to provide a maximum power.

2. The method according to claim 1 wherein providing a predetermined maximum power to the compressor includes providing power from a high voltage battery.

3. The method according to claim 2 wherein providing a predetermined maximum power to the compressor also includes providing power from a low voltage battery and the fuel cell stack.

4. The method according to claim 2 further comprising using the fuel cell stack to charge the high voltage battery if it reaches a predetermined minimum state-of-charge during the power up-transient.

5. The method according to claim 4 further comprising using the available power from the system to first provide the predetermined maximum power to the compressor, second to charge the high voltage battery and third to satisfy the power request.

6. The method according to claim 1 wherein increasing the pressure of the cathode side of the fuel cell stack includes waiting a predetermined period of time after the fuel cell system power has achieved the power request to increase the cathode side pressure.

7. The method according to claim 6 wherein the predetermined period of time is about 10 seconds.

8. The method according to claim 1 further comprising using any remaining power to satisfy the power request beyond that power that is provided to the compressor.

9. The method according to claim 1 wherein the power request is for providing power to an electric traction system on a fuel cell hybrid vehicle.

* * * * *